(12) United States Patent
Spierdijk

(10) Patent No.: US 10,968,585 B2
(45) Date of Patent: Apr. 6, 2021

(54) VACUUM INSTALLATION FOR INDUSTRIAL VACUUM PROCESSES

(71) Applicant: Koks Group B.V., Alkmaar (NL)

(72) Inventor: Nic Spierdijk, Zuid-Scharwoude (NL)

(73) Assignee: Koks Group B.V., Alkmaar (NL)

( * ) Notice: Subject to any disclaimer, the term of this patent is extended or adjusted under 35 U.S.C. 154(b) by 47 days.

(21) Appl. No.: 16/310,473

(22) PCT Filed: Jun. 19, 2017

(86) PCT No.: PCT/NL2017/050407
§ 371 (c)(1),
(2) Date: Dec. 17, 2018

(87) PCT Pub. No.: WO2017/217857
PCT Pub. Date: Dec. 21, 2017

(65) Prior Publication Data
US 2019/0264403 A1    Aug. 29, 2019

(30) Foreign Application Priority Data

Jun. 17, 2016 (NL) ...................................... 2016990

(51) Int. Cl.
| | |
|---|---|
| *E01H 1/08* | (2006.01) |
| *B60P 3/22* | (2006.01) |
| *E01H 1/00* | (2006.01) |
| *E01H 1/10* | (2006.01) |
| *F04F 1/12* | (2006.01) |

(52) U.S. Cl.
CPC .......... *E01H 1/0827* (2013.01); *B60P 3/2255* (2013.01); *E01H 1/001* (2013.01); *E01H 1/108* (2013.01); *F04F 1/12* (2013.01)

(58) Field of Classification Search
CPC ....... E01H 1/001; E01H 1/108; E01H 1/0827; E01H 1/0836; E01H 1/0845;
(Continued)

(56) References Cited

U.S. PATENT DOCUMENTS

| 3,486,297 A | * | 12/1969 | Simon | ..................... | E21B 43/34 95/22 |
|---|---|---|---|---|---|
| 3,901,033 A |  | 8/1975 | McAlister |  |  |

(Continued)

FOREIGN PATENT DOCUMENTS

| DE | 202014000548 U1 | 5/2014 |
|---|---|---|
| EP | 0773327 A1 | 5/1997 |

(Continued)

OTHER PUBLICATIONS

Dutch Search Report dated Mar. 20, 2017.
International Search Report dated Sep. 13, 2017.

*Primary Examiner* — Craig J Price
(74) *Attorney, Agent, or Firm* — N.V. Nederlandsch Octrooibureau; Catherine A. Shultz; Katelyn J. Bernier

(57) ABSTRACT

The invention relates to a vacuum installation for industrial application, the installation comprising a first vessel having a first gas inlet for allowing a gaseous substance into the first vessel and a first outlet for depletion of a material, a second vessel having a second inlet for aspirating a quantity of material and a second gas outlet for depletion of the gaseous substance, wherein the gaseous substance comprises a vapour generated from the material, a storage chamber for storing the quantity of material, the storage chamber having a third inlet, wherein at least the first vessel communicates with an interior of the storage chamber via the first outlet and the third inlet; and a vacuum pump located in between the first vessel and the second vessel, and operated to lower the pressure in the second vessel, thereby allowing the material to be sucked into the second vessel via the second liquid inlet to an equilibrium level between the material and the gaseous substance, the vacuum pump being further operated to transport the gaseous substance to the first vessel to raise (Continued)

the pressure in the first vessel, thereby forcing the material in the first vessel into the storage chamber.

20 Claims, 5 Drawing Sheets

(58) Field of Classification Search
CPC .............. E01H 1/0854; E01H 2001/089; B60P 3/22–246; B60P 3/2255; F04F 1/02; F04F 1/06; F04F 1/14; F04F 1/10; F04B 9/103; Y10T 137/0396; Y10T 137/8622
USPC ......... 137/565.01, 565.11, 565.23, 571–576, 137/899–899.4, 345–355.12, 125, 206, 137/208, 209; 15/340.1–340.3, 315, 346, 15/347
See application file for complete search history.

(56) References Cited

U.S. PATENT DOCUMENTS

| | | | |
|---|---|---|---|
| 4,015,613 A * | 4/1977 | Papworth | ................ B08B 9/093 134/102.2 |
| 4,093,544 A | 6/1978 | Ross | |
| 4,707,878 A | 11/1987 | Urbani | |
| 5,704,989 A | 1/1998 | Page | |
| 5,904,737 A | 5/1999 | Preston et al. | |
| 5,996,171 A * | 12/1999 | Bowers | ................ B01D 46/002 15/340.1 |
| 6,245,553 B1 * | 6/2001 | Keyser | ................... C12M 29/24 422/4 |
| 8,580,020 B2 | 11/2013 | Hebblethwaite | |
| 8,597,602 B2 | 12/2013 | Finley et al. | |
| 8,801,843 B1 | 8/2014 | St. Amant et al. | |
| 10,253,792 B2 * | 4/2019 | Schmidt | .................... B08B 3/04 |
| 2005/0005968 A1 * | 1/2005 | Berry | ....................... B67D 7/78 137/205 |
| 2008/0202395 A1 | 8/2008 | Jeong | |
| 2017/0240414 A1 * | 8/2017 | Innes | ................... B67D 7/0266 |
| 2018/0283406 A1 * | 10/2018 | Rivard | .................... F04B 15/02 |

FOREIGN PATENT DOCUMENTS

| | | | | |
|---|---|---|---|---|
| FR | 1559578 | * | 10/2015 | |
| WO | 2015157869 A1 | | 10/2015 | |
| WO | WO-2017060616 A1 | * | 4/2017 | ................ F04F 1/14 |

* cited by examiner

VACUUM INSTALLATION FOR INDUSTRIAL VACUUM PROCESSES

BACKGROUND OF THE INVENTION

1. Field of the Invention

The present invention relates to a vacuum installation for industrial vacuum processes to reduce emission of a gaseous substance from an aspirated material. The invention also relates to a vacuum truck with such a vacuum installation. Furthermore, the invention relates to a method of use of such a vacuum installation.

2. Description of the Related Art

Vacuum installations for industrial vacuum processes, which can be provided on a truck or another kind of vehicle, or as a self-supporting independently working unit, are used in various capacities for aspirating liquids and particulate materials, or a mixture thereof. They may also be operated in reverse as blowers for delivering particulate material, should this be required. The vacuum installations function as air or gas displacement systems and are designed for heavy industrial applications. Such vacuum installations are suitable for suctioning, displacement, transport and/or upload of dry, wet and/or hazardous substances, such as various types of chemical catalysts and/or liquids, gravel, powders, fly ash and sludges.

Various configurations exist, but in general, all such vacuum installations or vacuum trucks are provided with some form of vacuum chamber to which a vacuum is applied using a vacuum pump of appropriate size for the operation concerned. The vacuum chamber is provided with one or more inlets through which the material to be aspirated may enter the vacuum chamber. This will usually be in the form of a pipe coupling to which a flexible pipe can be attached.

Usually, the vacuum chamber is used as a storage chamber as well, wherein the material is stored after aspiration. Due to the lower pressure relative to ambient pressure, in the vacuum chamber, a certain amount of liquid present in the material vaporizes to reach a new liquid/vapour equilibrium. This vapour may be emitted to the environment by means of the vacuum pump. In addition, a certain amount of the generated vapour will be emitted to the environment via valves and the like during the process.

Such emissions of vapour may be detrimental to the environment and/or harmful for the operators operating the vacuum installation. In particular this may be the case for hydrocarbons, including petrochemical products like diesel oil and benzene, or any other materials that are liquid at room temperature. It is desired to reduce this emission.

A well-known solution is to use so-called scrubbers, also known as scrubber systems or air pollution control devices, to remove particulates or gases from the emitted vapour. A disadvantage of using scrubbers is that they have a limited cleaning capacity, and they will at a certain point be saturated with the gas or particulate to be removed from the vapour. As such, it may be the case that the scrubber needs to be replaced several times during a vacuuming operation.

Additionally, the combined function of the vacuum chamber as a storage chamber has the disadvantage that the volume of material for storage is limited, as vapour is being generated in the vacuum chamber. At a certain point, it will not be possible to reduce the pressure in the vacuum chamber further to aspirate more material, for instance due to the vacuum pump power. At this stage, the vacuum installation may need to be emptied or replaced by another vacuum installation if the vacuuming process is not finished yet. This decreases the efficiency of a vacuum installation and increases the duration and costs of the vacuuming process.

It would be desirable to provide an improved vacuum installation that alleviated some or all of the above problems.

BRIEF SUMMARY OF THE INVENTION

According to the invention there is provided a vacuum installation for industrial application, the installation comprising:

a first vessel having a first gas inlet for allowing a quantity of a gaseous substance into the first vessel and a first outlet for depletion of a material, a second vessel having a second inlet for aspirating a quantity of material and a second gas outlet for depletion of the gaseous substance, wherein the gaseous substance comprises a vapour generated from the material a storage chamber for storing the quantity of material, the storage chamber having a third inlet, wherein at least the first vessel communicates with an interior of the storage chamber via the first outlet and the third inlet;

a vacuum pump located in between the first vessel and the second vessel, and operated to lower the pressure in the second vessel, thereby allowing the material to be sucked into the second vessel via the second liquid inlet to an equilibrium level between the material and the gaseous substance, the vacuum pump being further operated to transport the gaseous substance to the first vessel to raise the pressure in the first vessel, thereby forcing the material in the first vessel through the first outlet into the storage chamber.

Preferably, the second vessel and the first vessel are connected in series with each other.

The vacuum installation uses at least two vessels, or tanks or chambers, and a separate storage tank or chamber. The vessels are closed, except for pre-determined inlets and outlets. The at least two vessels and the vacuum pump are connected in series, whereby the vacuum pump is positioned between and connected to the vessels, such that when a gaseous substance is drawn from a first vessel to lower the pressure in the first vessel, the gaseous substance is transported to a second vessel to increase the pressure in the second vessel. As such, the vessels and the vacuum pump form a system in which the present gaseous substance of one vessel is used to force material present in the other vessel out, into the storage chamber. When the pressure is lowered in the second vessel, the second vessel functions as a vacuum vessel. Simultaneously or shortly after, the pressure in the first vessel is increased, such that the first vessel functions as a pressure vessel.

The material being aspirated by the vacuum installation may comprise a gaseous substance and/or a liquid material. For instance, the material is a particulate material or a powder that is contaminated with a liquid or gas. The material may be a liquid material as such, including emulsions. Additionally, the material may be mixture of a solid and a liquid material, for instance a suspension, or a slurry. The material may comprise a material having a flash point of below 25 degrees Celsius.

Substances that may be aspirated by the vacuum installation may be flammable liquids, such as liquid hydrocarbons, like kerosene or n-hexane; oxidizers, such as lithium peroxide or magnesium chlorate; poisonous substances, such as mercury oxide or cadmium compounds; corrosive substances, such as potassium sulphide or bisulphites; and other dangerous substances, such as environmentally hazardous substances, like nickel sulphide or lead chromates. These substances include substances of classes 3 (flammable liquids), 5.1 (oxidizing substances), 6.1 (toxic substances), 8 (corrosive substances) and 9 (miscellaneous dangerous substances and articles) of the ADR Hazard classes (ADR is the European Agreement concerning the International Carriage of Dangerous Goods by Road).

While being aspirated by the vacuum installation and while remaining in the vessel with the lowered pressure, some of the liquid may vaporize into a vapour and may escape the material due to the lowered pressure. Similarly, the gaseous substance may escape the material. A vapour is a gaseous substance and is defined as a substance in the gas phase at a temperature lower than its critical point, which means that the vapour can be condensed to a liquid by increasing the pressure on it without reducing the temperature. The gaseous substance may comprise a mixture of air and the vapour being generated from the material.

The vacuum installation is preferably used for substances that are liquid at room temperature, or at least liquid at ambient circumstances, such as petrochemical liquids, for instance benzene or diesel oil.

While increasing the pressure in the pressurised vessel, a certain volume of the vapour may condense into liquid, thereby increasing the amount of liquid that enters the storage chamber or tank. The pressure in the pressurised vessel and/or storage chamber is at least atmospheric pressure, preferably higher e.g. greater than 1.5 bar or 2 bar or 3 bar or even up to 4 bar, thereby reducing the amount of liquid being vaporized. As such, a larger volume of material can be stored in the storage chamber. According to an embodiment, after the material in the first vessel is forced into the storage chamber, the vacuum pump is operated to lower the pressure in the first vessel, thus allowing the material to be sucked into the first vessel via a first inlet to an equilibrium level between the material and the gaseous substance, and transporting the gaseous substance to the second vessel via a second gas inlet to raise the pressure in the second vessel, thereby forcing a material in the second vessel into the storage chamber through a second outlet that is in fluid communication with the third inlet of the storage chamber. The transportation of the gaseous substance can be done simultaneously or shortly after the aspiration of the material.

In this embodiment, the first and second vessels switch functions, i.e. the first vessel is used as a vacuum vessel to suck in the material to be vacuumed, and the second vessel acts as a pressure vessel to force the material already in the second vessel into the storage chamber.

The vessels may each be connected to the vacuum pump via a respective gas port, functioning intermittently as a gas outlet or gas inlet, depending on the function of the vessels at that time, and suitable conduits. A first gas valve may be located between the first vessel and the vacuum pump, wherein the first gas valve has an open and a closed position, wherein in the closed position, the fluid connection between the vacuum pump and the first vessel is closed and the vacuum pump is operated to suck in the material in the second vessel, and wherein in the open position the vacuum pump is operated to suck in the material into the first vessel.

Additionally, a second gas valve may be located between the second vessel and the vacuum pump, wherein the second gas valve has an open and a closed position, wherein in the closed position, the fluid connection between the vacuum pump and the second vessel is closed and the vacuum pump is operated to suck in the material into the first vessel, and wherein in the open position the vacuum pump is operated to suck in the material into the second vessel.

It is preferred that the volume of the vessels does not exceed 1 m³ (cubic meter). After use of the vessels in a vacuuming process, some material will remain in the vessels. When this volume does not exceed 1 cubic meter, the vacuum chambers can more easily be transported over the road, as such small volumes do not need to comply with diverse regulations for dangerous or hazardous substances over land (VLG, ADR, etc.).

Additionally, the volume of the vessels needs to be limited so as to reduce the amount of vapour being generated. The more vapour is being generated, the more emission of the vapour to an outside will occur.

The volume of the storage chamber can be equal to a regular vacuum chamber used in vacuum installations according to the prior art, being from about 6 to 35 m3 (cubic meter), dependent on the allowed weight of the truck or trailer.

When using a pump with increased suctioning power, the number of vessels used may be increased to optimize the efficiency of the vacuuming process and to counteract the increased emission of the heavier pump. For instance, a vacuum installation comprising three, four or more vessels may be used.

The vessels may each be provided with one or more inlets through which the material to be sucked may enter the respective vessel. This will usually be in the form of a pipe coupling to which a flexible pipe can be attached.

Preferably, the installation comprises a controller, arranged to control the first and/or second gas valve to assume the open and/or closed position, such that the material is sucked into the one of the first or second vessel and the gaseous substance is used to force the material from the other of the second or first vessel into the storage chamber. The controller may be used to control the alternating functions of the vessels and execute the methods described above and hereinafter. As such, the controller arranges that the vacuum pump draws the gaseous substance from only one vessel and that the material in the other vessel is forced into the storage chamber. This may be achieved, for instance, by using suitable valves to open and close conduits that allow a flow of material and/or gaseous substance between the respective vessels and/or storage chamber.

According to an embodiment, upon first use both the first vessel and second vessel have a relatively low material level and the vacuum pump is operated to suck in the material into the second vessel, wherein the gaseous substance in the second vessel is transported by the vacuum pump to the first vessel. The gaseous substance may be further transported to the storage chamber.

During a first use cycle, both vessels may be empty or have a very low level of material. To start the process with the alternating functions of the at least two vessels, upon first use the second vessel is filled and the gaseous substance is transported to the first vessel. During this process, no or very little material is forced into the storage chamber.

Upon final use, the vacuum pump may be operated to increase the pressure in the vessels, such that any remaining gaseous substance and/or material in the respective vessels are forced into the storage chamber.

In order to obtain a lowest amount of gaseous substance and/or material remaining in the vessel(s) after the vacuuming process has finished or upon final use, the vacuum pump may be used to increase the pressure in one or both vessels to force the remaining gaseous substance and/or material in the respective vessel(s) to the storage chamber. The gaseous substance may thus be a compressed gaseous substance and may be used to force any remaining material into the storage chamber. Alternatively, or additionally, the remaining gaseous substance may be forced into the storage chamber. Due to the higher pressure in the storage chamber, the gaseous substance, being a vapour, may condense to liquid.

The storage chamber is provided with a third outlet. This third outlet may be provided at a top side of the storage chamber. The third outlet may be a gas outlet for emitting gaseous substance from the storage chamber. During the vacuuming process, it may be necessary to emit the gaseous substance from the storage chamber, for instance when the pressure in the storage chamber reaches a certain level. By using at least two vessels as described earlier, in combination with the storage chamber, the emission of gaseous substance from the vacuum installation is reduced by at least 20% (percent) relative to the classic vacuum installations using only one vessel in which the material is also stored.

Preferably, the third gas outlet is in fluid communication with an air pollution control device for cleaning the gaseous substance emitted from the storage chamber. The air pollution control device may be a scrubber system. By using such a device, the gaseous substance emission of the vacuum installation may be reduced by at least 40% (percent), preferably by 60% (percent), relative to the classic vacuum installations.

According to an embodiment, the third inlet of the storage chamber extends into the interior of the storage chamber. Preferably, the third inlet of the storage chamber extends from a top side of the storage chamber towards a bottom of the storage chamber. More preferably, the third inlet opens out in the storage chamber at a distance less than half of a distance between the top side and the bottom side of the storage chamber. This has the effect that at the certain time, the third inlet opens out below a material level. This has the advantage that the agitation of the material in the storage chamber is reduced, which may be of importance for liquids that have a flash point of around 25 degrees Celsius or below, for instance 23 degrees Celsius or below.

In addition or as an alternative to the third inlet extending into the storage chamber, the third inlet may be provided with a bleed chamber to bleed the gaseous substance generated from the liquid material transported to the storage chamber. By bleeding gaseous substance from the liquid material transported into the storage chamber, the agitation of the liquid material already in the storage chamber may be (further) reduced, thereby reducing the amount of gaseous substance generated in the storage tank.

The invention also relates to a vacuum truck comprising a vacuum installation as described above. When the vacuum installation as described above is placed onto a vacuum truck, the installation can more easily be relocated. Additionally, the vacuum truck can operate the installation in remote places by providing electricity for the vacuum pump by means of the truck engine. The vacuum installation may also be separately used, without the truck.

Furthermore, the invention relates to a method of operating a vacuum installation for industrial application to aspirate a quantity of material, the vacuum installation comprising:

a first vessel having a first gas inlet for allowing a quantity of a gaseous substance into the first vessel and a first outlet for depletion of a material, a second vessel having a second liquid inlet for aspirating a quantity of the material and a second gas outlet for depletion of the gaseous substance, wherein the gaseous substance comprises a vapour generated from the material, a storage chamber for storing the quantity of material, the storage chamber having a third inlet, wherein at least the first vessel communicates with an interior of the storage chamber via the first outlet and the third inlet, and a vacuum pump located in between the first vessel and the second vessel, wherein the method comprises:

(i) operating the vacuum pump to lower the pressure in the second vessel, thereby sucking the material into the second vessel via the second inlet to an equilibrium level between the material and the gaseous substance, (ii) transporting the gaseous substance to the first vessel to raise the pressure in the first vessel, thereby forcing the material in the first vessel through the first outlet into the storage chamber.

Transporting the gaseous substance or vapour may be done simultaneously or subsequently, either directly afterwards or with a small time interval in between. Preferably, the second vessel and the first vessel are connected in series with each other. The gaseous substance may comprise a mixture of air and the vapour being generated from the material.

Preferably, the vacuum installation is a vacuum installation as described above.

The method may further comprise, after step (ii):

(iii) operating the vacuum pump to lower the pressure in the first vessel, thus allowing the material to be sucked into the first vessel via a first inlet to an equilibrium level between the material and the gaseous substance from the material, and (iv) transporting the gaseous substance to the second vessel via a second gas inlet to raise the pressure in the second vessel, thereby forcing the material in the second vessel into the storage chamber through a second outlet that is in fluid communication with the third inlet of the storage chamber.

According to an embodiment, upon first use both the second vessel and first vessel have a relatively low material level, and the method comprises, before step (i):

operating the vacuum pump to suck in the material into the second vessel to an equilibrium level between the material and the gaseous substance from the material,
transporting the gaseous substance of the second vessel to the first vessel.

In order to start the use cycles of the vacuum installation, the first vessel is filled with material by operating the vacuum pump such that the material is sucked into the first vessel, while the gaseous substance in the first vessel is transported to the second vessel and, preferably, subsequently to the storage chamber. As such, the first vessel can be filled to a maximum level, and the gaseous substance in the second vessel is used during the subsequent cycle to increase the pressure in the first vessel.

Upon final use, the method may further comprise after step (iv):

operating the vacuum pump to increase the pressure in the vessels, thereby forcing any remaining gaseous substance and/or material in the respective vessels into the storage chamber.

The storage chamber may be provided with a gas outlet, and the method may further comprise emitting the gaseous substance from the storage chamber.

Preferably, the gas outlet is in fluid communication with an air pollution control device and the method further comprises cleaning the emitted gaseous substance from the storage chamber by forcing the gaseous substance through the air pollution control device before final emission to an exterior.

More generally, the invention also comprises a method of collecting a material comprising a volatile fraction in a storage chamber, the method comprising: operating a vacuum pump to apply a vacuum to a first vessel and aspirate the material into the first vessel, while simultaneously pressurising a quantity of the material in a second vessel; transporting a quantity of the material from the second vessel to the storage chamber under pressure; and alternating the operation to aspirate material to the second vessel, while pressurising material in the first vessel for transportation to the storage chamber. The method may be carried out using the structure and parameters described above and hereinafter. It will be understood that although reference is given to alternating the operation and to first and second vessels, this is not intended to be limiting on just two vessels and the principle may be applied to any number of vessels operating sequentially, alternately, in a round-robin arrangement or otherwise to act first as a vacuum vessel and subsequently as a pressure vessel. Each vessel is thus capable of withstanding both negative pressures and positive pressures.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
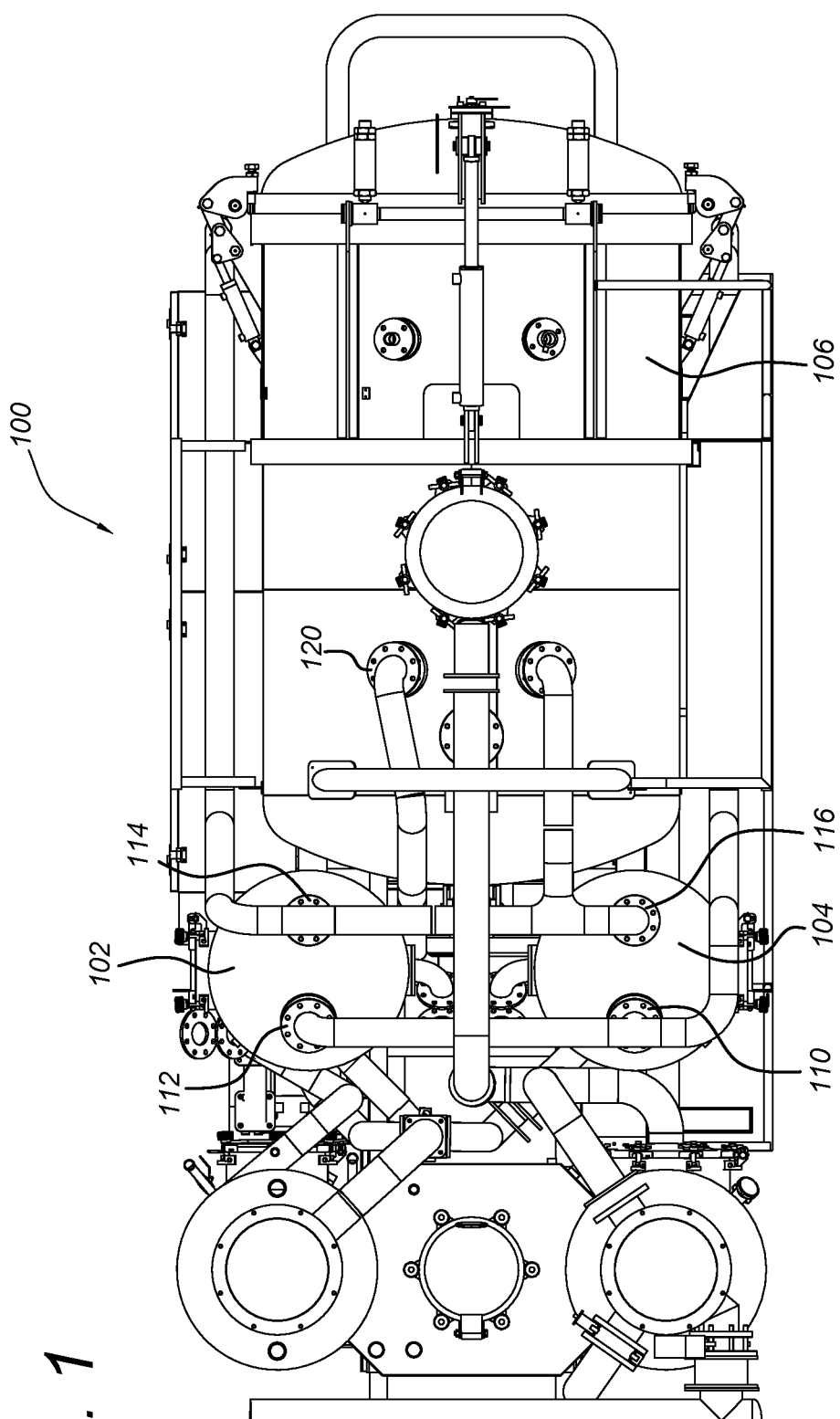
FIG. 1 shows a top view of a vacuum installation according to a first embodiment of the present invention.

FIG. 1 shows a top view of a vacuum installation 100 incorporating two vessels 102, 104 and a storage chamber 106. A first vessel 102 is provided with a first inlet 112 and a first gas port 114. A second vessel 103 is provided with a second inlet 110 and a second gas port 116. The first and second gas ports 114, 116 are in communication with each other via a vacuum pump 108, see FIG. 2. The vacuum pump 108 is in between the vessels 102, 104 and is in connection to both vessels. The vessels are in serial connection to each other. The first and second inlets 112, 110 are in communication with each other through a common inlet hose 111, see FIGS. 3-5. The storage chamber is provided with a third inlet 120 for passage of material from the vessels into the storage chamber.

Figure 2:
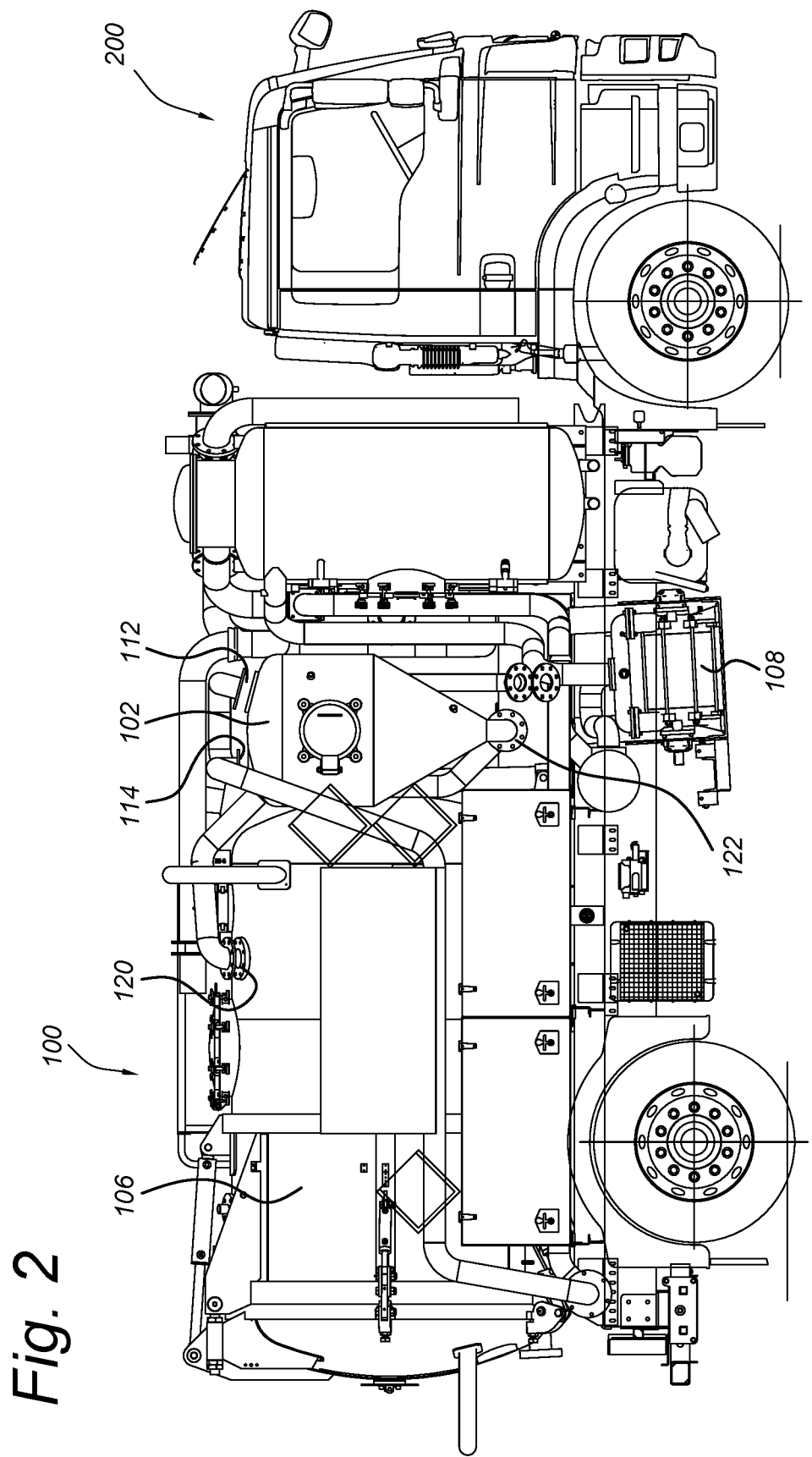
FIG. 2 shows a side view of a vacuum truck comprising the vacuum installation of FIG. 1.

FIG. 2 shows a side view of a vacuum truck 200 comprising the vacuum installation 100 of FIG. 1. The vacuum installation 100 is shown to be further provided with the vacuum pump 108. The vacuum pump 108 is in communication with the first and second vessels 102, 104. The first vessel 102 is shown to have a first outlet 122. The second vessel 104 has a similar second outlet 130, see FIGS. 3-5.

Figure 3:
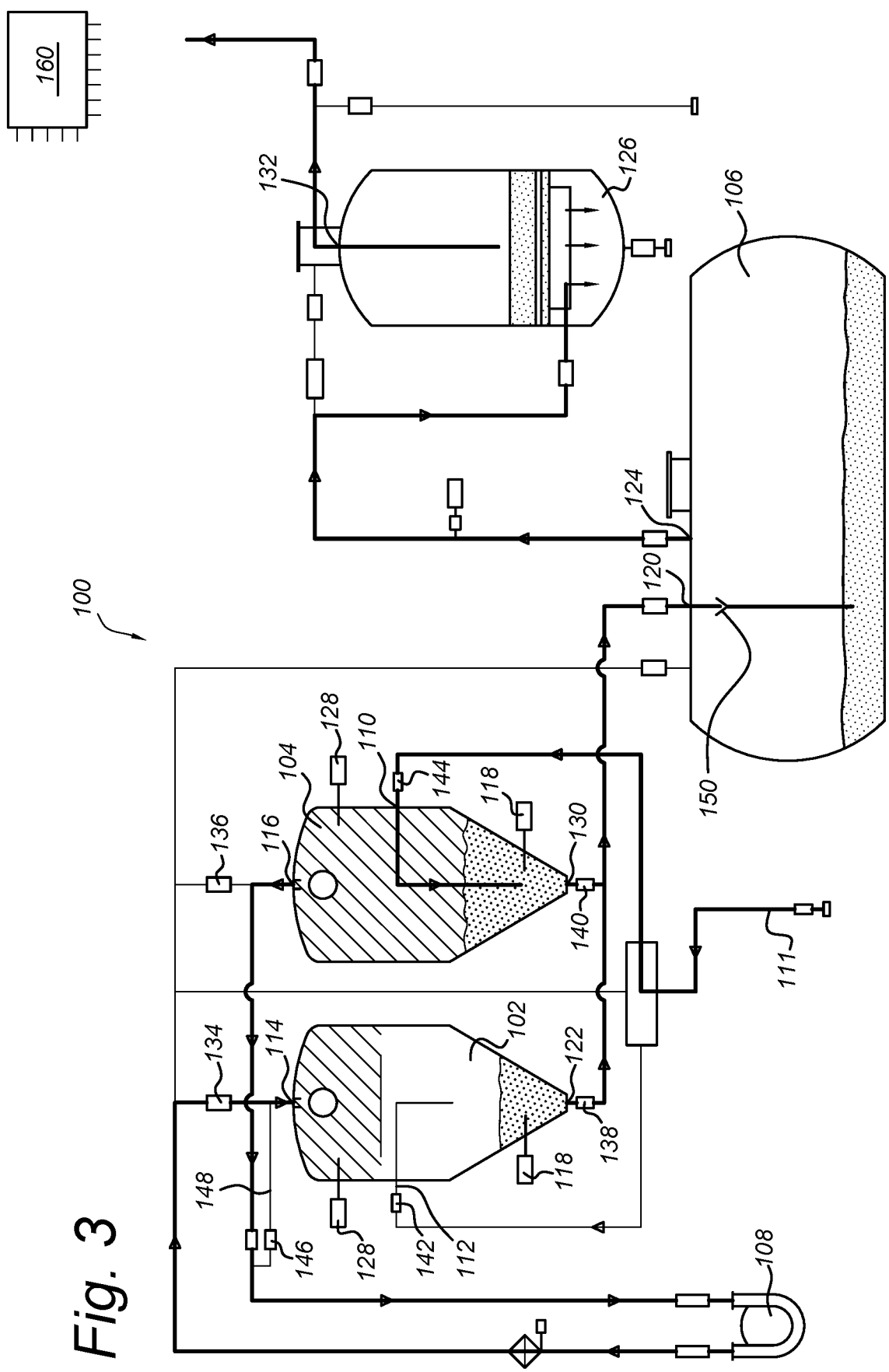
FIG. 3 shows schematic view of the vacuum installation of FIG. 1 upon first use.

FIG. 3 shows schematic view of the vacuum installation 100 of FIG. 1 upon first use. Upon first use, the material level in both vessels is relatively low, for instance close to a minimum material level that is indicated by a material level sensor 118 or the like. The vacuum pump 108 is operated to lower the pressure in the second vessel 104, by drawing out a gaseous substance, most likely a mixture of vapour and air, from the second vessel 104. The material is then sucked into the second vessel 104 via the common inlet hose 111 and the second inlet 110. The passage to the first inlet 112 is closed by means of a first inlet valve 142. The second outlet 130 is closed by means of a second outlet valve 140 in its closed position. The passage to the second inlet 110 is opened by means of a second inlet valve 144 assuming its open position. The first outlet is opened by means of a first outlet valve 138 assuming its open position. A first gas valve 134 located between the first vessel 102 and the vacuum pump 108 is in the closed position to prevent lowering the pressure in the first vessel and thus preventing material being sucked in the first vessel 102. A second gas valve 136, located between the second vessel 104 and the vacuum pump 108, is in the open position to allow lowering the pressure in the second vessel thus allowing the material to be sucked into the second vessel 104. While operating the vacuum pump 108 in this first use cycle, the generated vapour in the second vessel 104 is transported to the first vessel 102 through the second gas port 116, functioning now as a second gas outlet, pressurized at the outlet of the vacuum pump 108 and delivered to the first gas port 114, now functioning as a first gas inlet. The pressurised vapour can subsequently condense and be transported to the storage chamber 106 through the first outlet 122 and the third inlet 120. A controller 160 is operatively connected to control the various valves and other elements of the installation.

Figure 4:
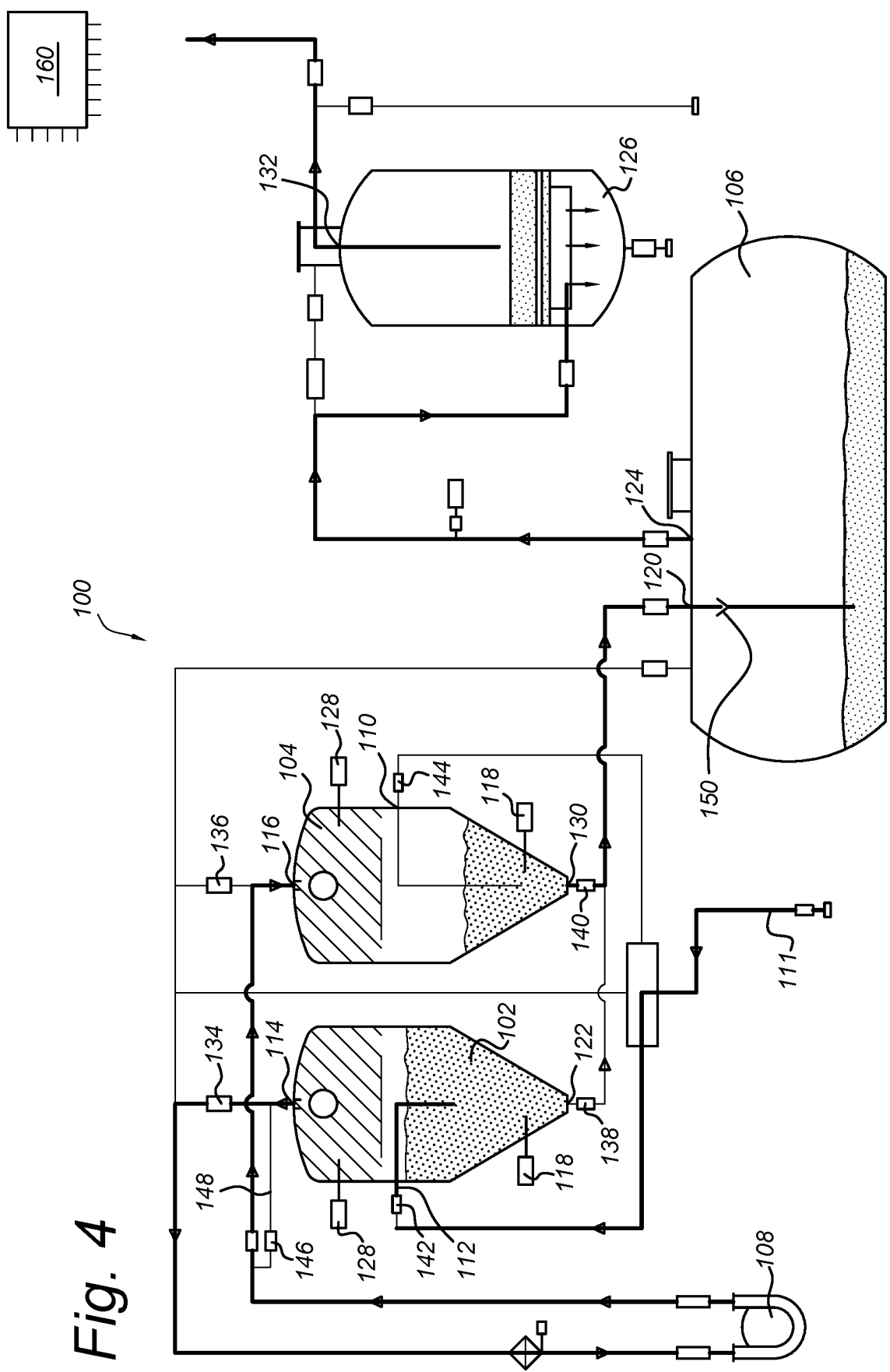
FIG. 4 shows a schematic view of the vacuum installation of FIG. 1 at normal operation.

FIG. 4 shows a schematic view of the vacuum installation 100 of FIG. 1 at normal operation. After the second vessel 104 is filled with material by sucking in the material through operating of the vacuum pump 108, the first valve 134 is moved to an open position, wherein the vacuum pump 108 is operated to lower the pressure in the first vessel such that the liquid material is sucked into the first vessel 102, and the second valve 136 is moved to a closed position, wherein the fluid connection between the vacuum pump 108 and the second vessel 104 is closed. The vacuum pump 108 is thus operated to suck in the material into the first vessel 102. As such, the first vessel 102 is filled with the material. The passage to the second inlet 110 is closed by means of a second inlet valve 144 assuming its closed position. The first outlet 122 is closed by means of a first outlet valve 138 assuming its closed position. The passage to the first inlet 112 is opened by means of a first inlet valve 142 assuming its open position. The second outlet 130 is opened by means of a second outlet valve 140 assuming its open position. The generated vapour from the first vessel 102 is then transported by the vacuum pump 108 to the second vessel 104 through the first gas port 114, functioning now as a first gas outlet, and the second gas port 116, now functioning as a second gas inlet. Upon arrival, the generated vapour forces the material in the second vessel 104 into the storage chamber 106 through the second outlet 130 and the third inlet 120.

This normal operation cycle is repeated by filling the then emptied second vessel 104 again with material. For this, the first valve 134 assumes its closed position again to prevent material being sucked in by the first vessel 102, and the second valve 136 assumes its open position again to allow the liquid material to be sucked into the second vessel 104. The passage to the first inlet 112 is then closed by means of the first inlet valve 142 assuming its closed position. The second outlet 130 is closed by means of the second outlet valve 140 assuming its closed position. The passage to the second inlet 110 is opened by means of the second inlet valve 144 assuming its open position. The first outlet 122 is opened by means of the first outlet valve 138 assuming its open position. While operating the vacuum pump 108, the generated vapour in the second vessel 104 is transported to the first vessel 102 through the second gas port 116, functioning again as the second gas outlet, and the first gas port 114, again functioning as the first gas inlet. Upon arrival of the vapour in the first vessel 102, the material in the first vessel 102 is forced into to the storage chamber 106 through the first outlet 122 and the third inlet 120.

Figure 5:
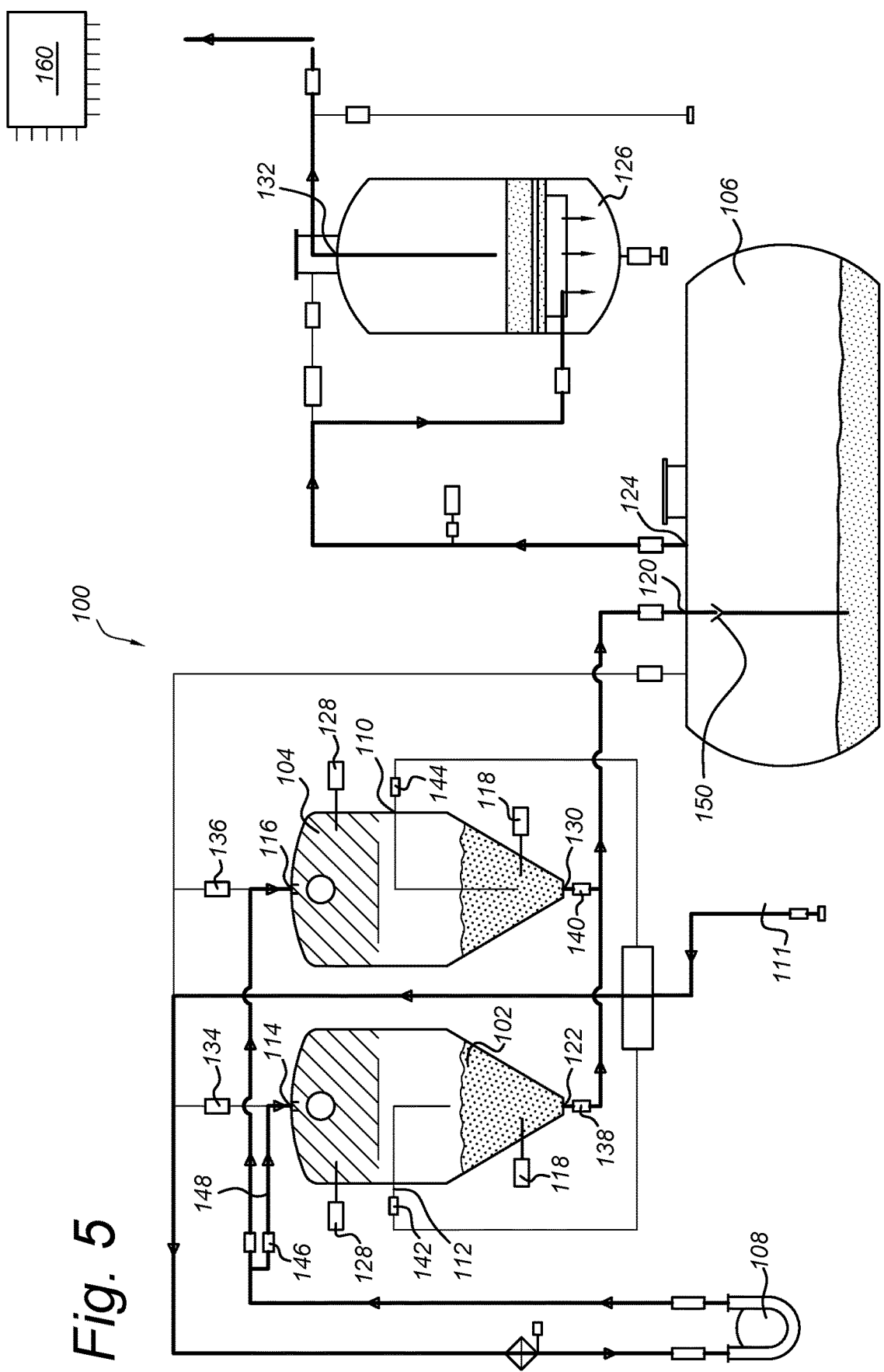
FIG. 5 shows a schematic view of the vacuum installation of FIG. 1 upon final use.

FIG. 5 shows a schematic view of the vacuum installation 100 of FIG. 1 upon final use. After a number of cycles depicted in FIG. 4 and described above, alternating the functions of vacuum vessel and pressure vessel between the first and second vessels, the vacuum process comes to an end. For instance when the material to be vacuumed is (almost) all aspirated, or when the storage chamber has reached its maximum level of stored material.

In a final use cycle, the vacuum pump 108 is directly in communication with the inlet hose 134, drafting in air or a gas mixture into the vacuum installation. As such, the vacuum pump forces a gaseous substance into the vacuum installation and thus increases the pressure in the first and/or second vessels. Any remaining vapour or gaseous substance and/or material in the respective vessels is thus forced into the storage chamber 106. This operation can be done for both vessels 102, 104 at once, as shown in FIG. 5. Alternatively, this cycle can be done for vessel 102, 104 individually.

As shown in FIG. 5, the first and second inlet valves 142, 144 have both assumed their closed positions, such that the air is not drawn into the respective vessels 102, 104. Similarly, the first and second gas valves 134, 136 have assumed their closed positions, such that the vacuum pump 108 cannot lower the pressure in the respective vessels 102, 104. A by-pass valve 146 that was in its closed position the first use cycle and during normal use, as shown in FIGS. 3 and 4, thereby closing off the by-pass 148 to the first gas port, has now assumed its open position, thereby opening the by-pass 148. The drawn-in air is forced into the first vessel 102 through the by-pass 148 and the gas port 114, and additionally into the second vessel 104 through the second gas port 116. The pressure in both vessels 102, 104 is thus increased, forcing any remaining vapour and/or material into the storage chamber 106. For this, both outlet valves 138, 140 are in their open position to allow a flow of material and/or vapour into the storage chamber 106.

FIGS. 3-5 show that the storage chamber 106 is provided with a third liquid inlet that extends into the interior of the storage chamber 106. The third inlet of the storage chamber is provided with a bleed chamber 150 to bleed the gaseous substance generated from the material transported into the storage chamber 106. This reduces the agitation of the liquid material already in the storage chamber 106.

The storage chamber 106 is further provided with a third outlet 124 to emit gaseous substance from the storage chamber. The third outlet 124 is provided at a top side of the storage chamber. Before emission to the environment, the gaseous substance is forced through an air pollution control device or scrubber system 126. This scrubber system 126 is in fluid connection with the storage tank 106 and is used to clean the emitted gaseous substance from the storage chamber before emission to the environment through an outlet 132 of the scrubber.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A vacuum truck comprising a vacuum installation for aspirating a material, the installation comprising:
   a first vessel having a first gas port for allowing a quantity of a gaseous substance into the first vessel, a first inlet for aspirating a quantity of the material and a first outlet for depletion of the material,
   a second vessel having a second inlet for aspirating a quantity of the material, a second gas port for depletion of the gaseous substance, wherein the gaseous substance comprises a vapour generated from the material and a second outlet for depletion of the material,
   a storage chamber for storing the quantity of material, the storage chamber having a storage chamber inlet, wherein at least the first vessel communicates with an interior of the storage chamber via the first outlet and the storage chamber inlet, and
   a vacuum pump located in between the first vessel and the second vessel, and operable to lower the pressure in the second vessel, thereby allowing the material to be sucked into the second vessel via the second inlet to an equilibrium level between the material and the gaseous substance, the vacuum pump being further operable to transport the gaseous substance to the first vessel to raise the pressure in the first vessel, thereby forcing the material in the first vessel through the first outlet into the storage chamber,
   wherein after the material in the first vessel is forced into the storage chamber, the vacuum pump is further operable to lower the pressure in the first vessel, thus allowing the material to be sucked into the first vessel via the first inlet to an equilibrium level between the material and the gaseous substance, and transport the gaseous substance to the second vessel via the second gas port to raise the pressure in the second vessel, thereby forcing the material in the second vessel into the storage chamber through the second outlet and the storage chamber inlet, wherein the installation is mounted on the vacuum truck.

2. The vacuum truck according to claim 1, comprising a first gas valve located between the first vessel and the vacuum pump, wherein the first gas valve has an open and a closed position, wherein in the closed position, the fluid connection between the vacuum pump and the first vessel is closed and the vacuum pump is operable to suck in the material in the second vessel, and wherein in the open position the vacuum pump is operated to suck in the material into the first vessel; and
   comprising a second gas valve located between the second vessel and the vacuum pump, wherein the second gas valve has an open and a closed position, wherein in the closed position, the fluid connection between the vacuum pump and the second vessel is closed and the vacuum pump is operated to suck in the material into the first vessel, and wherein in the open position the vacuum pump is operated to suck in the material into the second vessel.

3. The vacuum truck according to claim 2, comprising a controller, arranged to control the first and/or second gas valve to assume the open and/or closed position, such that the material is sucked into the one of the first or second vessel and the gaseous substance is used to force the material from the other of the second or first vessel into the storage chamber.

4. The vacuum truck according to claim 1, wherein upon first use both the first vessel and second vessel have a relatively low material level and the vacuum pump is operable to suck in the material into the second vessel, wherein the gaseous substance being generated in the second vessel is transported by the vacuum pump to the first vessel.

5. The vacuum truck according to claim 1, wherein upon final use, the vacuum pump is operable to increase the pressure in the vessels, such that any remaining gaseous substance and/or material in the respective vessels are forced into the storage chamber.

6. The vacuum truck according to claim 1, wherein the gaseous substance comprises a mixture of air and the vapour being generated from the material.

7. The vacuum truck according to claim 1, wherein the material comprises a petrochemical liquid.

8. The vacuum truck according to claim 1, wherein the material comprises a material having a flash point of below 25 degrees Celsius.

9. The vacuum truck according to claim 1, wherein the first inlet and the second inlet extend towards a bottom of the respective first and second vessels to open below the equilibrium level.

10. The vacuum truck according to claim 1, wherein the storage chamber is capable of withstanding pressures of greater than 3 bar.

11. A vacuum installation for industrial application, the installation comprising:
    a first vessel having a first gas inlet for allowing a quantity of a gaseous substance into the first vessel and a first outlet for depletion of a material,
    a second vessel having a second inlet for aspirating a quantity of material and a second gas outlet for depletion of the gaseous substance, wherein the gaseous substance comprises a vapour generated from the material,
    a storage chamber for storing the quantity of material, the storage chamber having a storage chamber inlet, wherein at least the first vessel communicates with an interior of the storage chamber via the first outlet and the storage chamber inlet, and
    a vacuum pump located in between the first vessel and the second vessel, and operable to lower the pressure in the second vessel, thereby allowing the material to be sucked into the second vessel via the second inlet to an equilibrium level between the material and the gaseous substance, the vacuum pump being further operable to transport the gaseous substance to the first vessel to raise the pressure in the first vessel, thereby forcing the material in the first vessel through the first outlet into the storage chamber, wherein a storage chamber outlet of the storage chamber is provided at a top side of the storage chamber for emitting the gaseous substance from the storage chamber; and
    wherein the storage chamber outlet is in fluid communication with an air pollution control device for cleaning the emitted gaseous substance from the storage chamber.

12. The vacuum installation according to claim 11, wherein the storage chamber inlet extends into the interior of the storage chamber to open out at a distance less than half of a distance between a top side and a bottom side of the storage chamber.

13. The vacuum installation according to claim 11, wherein the storage chamber inlet is provided with a bleed chamber to bleed the gaseous substance from the material being transported to the storage chamber.

14. The vacuum installation according to claim 11, wherein the second inlet extends towards a bottom of the second vessel to open below the equilibrium level.

15. The vacuum installation according to claim 11, wherein the storage chamber is capable of withstanding pressures of greater than 3 bar.

16. A method of operating a vacuum installation for industrial application to aspirate a quantity of material, the vacuum installation comprising:
    a first vessel having a first gas inlet for allowing a quantity of a gaseous substance into the first vessel and a first outlet for depletion of a material,
    a second vessel having a second liquid inlet for aspirating a quantity of the material and a second gas outlet for depletion of the gaseous substance, wherein the gaseous substance comprises a vapour generated from the material,
    a storage chamber for storing the quantity of material, the storage chamber having a storage chamber inlet, wherein at least the first vessel communicates with an interior of the storage chamber via the first outlet and the storage chamber inlet and wherein the storage chamber is provided with a storage chamber outlet in fluid communication with an air pollution control device, and
    a vacuum pump located in between the first vessel and the second vessel, wherein the method comprises:
    (i) operating the vacuum pump to lower the pressure in the second vessel, thereby sucking the material into the second vessel via the second inlet to an equilibrium level between the material and the gaseous substance,
    (ii) transporting the gaseous substance to the first vessel to raise the pressure in the first vessel, thereby forcing the material in the first vessel through the first outlet into the storage chamber; and emitting the gaseous substance from the storage chamber, including cleaning the gaseous substance emitted from the storage chamber by forcing the gaseous substance through the air pollution control device before final emission to an exterior.

17. The method according to claim 16, further comprising, after step (ii):
    (iii) operating the vacuum pump to lower the pressure in the first vessel, thus allowing the material to be sucked into the first vessel via a first inlet to an equilibrium level between the material and the gaseous substance, and
    (iv) transporting the gaseous substance to the second vessel via a second gas inlet to raise the pressure in the second vessel, thereby forcing the material in the second vessel into the storage chamber through a second outlet that is in fluid communication with the third inlet of the storage chamber.

18. The method according to claim 16, wherein upon first use both the second vessel and first vessel have a relatively low material level, and the method comprises, before step (i):
    operating the vacuum pump lower the pressure in the second vessel to suck in the material into the second vessel to an equilibrium level between the material and the gaseous substance, transporting the gaseous substance of the second vessel to the first vessel.

19. The method according to claim 16, further comprising after step (iv), upon final use:
   operating the vacuum pump to increase the pressure in the vessels, thereby forcing any remaining gaseous substance and/or material in the respective vessels into the storage chamber.

20. The method according to claim 16, further comprising raising the pressure in the storage chamber to more than 1.5 bar.

* * * * *